United States Patent
Gonzalez Ospina et al.

(10) Patent No.: US 11,097,960 B2
(45) Date of Patent: Aug. 24, 2021

(54) METHOD AND DEVICE FOR TREATING WATER BY CONTACT WITH AN ADSORBENT MATERIAL

(71) Applicant: SUEZ INTERNATIONAL, Paris la Defense (FR)

(72) Inventors: Adriana Gonzalez Ospina, Le Pecq (FR); David Ratte, Rueil Malmaison (FR)

(73) Assignee: SUEZ INTERNATIONAL, Paris (FR)

( * ) Notice: Subject to any disclaimer, the term of this patent is extended or adjusted under 35 U.S.C. 154(b) by 0 days.

(21) Appl. No.: 15/562,434

(22) PCT Filed: Apr. 18, 2016

(86) PCT No.: PCT/IB2016/052192
§ 371 (c)(1),
(2) Date: Sep. 28, 2017

(87) PCT Pub. No.: WO2016/170460
PCT Pub. Date: Oct. 27, 2016

(65) Prior Publication Data
US 2018/0086647 A1 Mar. 29, 2018

(30) Foreign Application Priority Data
Apr. 20, 2015 (FR) ...................... 1553501

(51) Int. Cl.
*C02F 1/28* (2006.01)
*C02F 1/52* (2006.01)
(Continued)

(52) U.S. Cl.
CPC ............ *C02F 1/283* (2013.01); *C02F 1/5245* (2013.01); *C02F 1/56* (2013.01); *C02F 2001/007* (2013.01); *C02F 2301/046* (2013.01)

(58) Field of Classification Search
CPC combination set(s) only.
See application file for complete search history.

(56) References Cited

U.S. PATENT DOCUMENTS

| | | | |
|---|---|---|---|
| 5,302,288 A * | 4/1994 | Meidl | C02F 1/283 210/616 |
| 7,648,637 B1 * | 1/2010 | Sauvignet | C02F 1/28 210/661 |

(Continued)

FOREIGN PATENT DOCUMENTS

| | | |
|---|---|---|
| FR | 2 932 795 A1 | 12/2009 |
| FR | 2 934 258 A1 | 1/2010 |

(Continued)

OTHER PUBLICATIONS

International Search Report, dated Jun. 13, 2016, from corresponding PCT/IB2016/052192 application.

(Continued)

*Primary Examiner* — Chester T Barry
(74) *Attorney, Agent, or Firm* — Nixon & Vanderhye (57) ABSTRACT

Disclosed is a method for treating water including: —an adsorption step which involves bringing the water into contact with a new adsorbant, the water being referred to as "pre-adsorbed water" before being brought into contact with the new adsorbant, and being referred to as "adsorbed water" after being brought into contact with the new adsorbant, and—a recirculation step which involves removing at least a portion of the new adsorbant brought into contact with the water during the adsorption step, the removed portion constituting a used adsorbant. During the recirculation step, the used adsorbant is brought into contact with the pre-adsorbed water. Also, the pre-adsorbed water does not undergo a clarification step that involves eliminating from the water at (Continued)

least a portion of the suspended matter that it contains. Also disclosed is a device for implementing such a method.

18 Claims, 2 Drawing Sheets

(51) Int. Cl.
  *C02F 1/56* (2006.01)
  *C02F 1/00* (2006.01)

(56) References Cited

U.S. PATENT DOCUMENTS

| | | | |
|---|---|---|---|
| 2008/0078721 A1 | 4/2008 | Binot et al. | |
| 2009/0101578 A1* | 4/2009 | McLeod | B01D 61/145 |
| | | | 210/650 |
| 2011/0192795 A1 | 8/2011 | Gais | |
| 2012/0255912 A1* | 10/2012 | Giraud | C02F 1/28 |
| | | | 210/665 |

FOREIGN PATENT DOCUMENTS

| | | |
|---|---|---|
| FR | 2 935 697 A1 | 3/2010 |
| FR | 2 973 794 A1 | 10/2012 |
| JP | 2003-024754 A | 1/2003 |

OTHER PUBLICATIONS

FR Search Report, dated Sep. 15, 2015, from corresponding FR 1553501 application.

\* cited by examiner

METHOD AND DEVICE FOR TREATING WATER BY CONTACT WITH AN ADSORBENT MATERIAL

TECHNICAL FIELD

The invention relates to the field of the treatment of a water, in particular in order to remove organic matter and micropollutants present in an urban or industrial wastewater or in a surface or underground water intended for the production of drinking water.

More specifically, the invention relates to a process and to a device for the treatment of a water employing an adsorbent of powdered activated carbon type.

PRIOR STATE OF THE ART

The objectives of restoration and of protection of the quality of waters have been reinforced and henceforth involve integrated management of the water cycle.

Various actions have currently been undertaken to limit the impact of organic matter and micropollutants, micropollutants being compounds present in the form of traces in water but which may bring about harmful effects for or via the environment and organisms. These actions involve the replacement or the reduction in the source of production of the most persistent chemical compounds, bioaccumulative and toxic (PBT), carcinogenic, mutagenic, reprotoxic (CMR) or endocrine disruptors.

Despite these efforts, and in view of the omnipresence of these compounds in products of everyday use and of the anthropic activity which diffuses them, micropollutants are quantified at still high amounts in waters.

Techniques targeted at reducing them are available in the prior state of the art but their incorporation in treatment networks has to be reexamined in order to propose technically/economically viable solutions while retaining satisfactory treatment performance levels.

In the field encompassed by the present invention, different techniques are used in an attempt to meet the objectives of improving the chemical and biological state of water bodies or in order to render drinkable the water from a resource. Networks for the production of drinking water and for the treatment of wastewater have been designed in order to treat both macropollutants (organic carbon, nitrogen and phosphorus pollution) and micropollutants (pesticides, PAHs, PCBs, phthalates, alkylphenols, hormones, medicinal substances, and the like).

There are many removal mechanisms and they encompass, inter alia, bacterial or chemical oxidation, volatilization, coagulation, adsorption or filtration using membranes having low cutoff thresholds. Among them, coagulation and adsorption (on the particulate matter present in the water, on the sludges produced during the treatments or also on a specific absorbent material) appear to be two main treatment routes.

In additional or finishing treatment, the adsorption is carried out in a dedicated reactor using a porous material having a low particle size and a high specific surface. Activated carbon is particularly suitable for the treatment of micropollutants and organic matter.

The removal of these compounds by adsorption takes effect by virtue of a surface phenomenon by which the molecules become attached to the solid surfaces of the activated carbon via different forces (electric charges, dipole-dipole interaction, Van der Waals forces) or bonds (hydrogen bonds, covalent bonds, and the like). The adsorption can either be physical (nonspecific) and depend essentially on the size of the surface, or chemical (specific), due to the presence of charged sites on the surface of the activated carbon.

Although it appears easy to carry out the adsorption, its performance is strongly conditioned by the physicochemical characteristics inherent in the micropollutants and the organic matter to be treated (size, molecular weight, hydrophobicity, charge, and the like), those of the material used (for an activated carbon: degree of activation, porosity and size distribution of the pores, specific surface, charge, structure, starting material from which the carbon derives, and the like), and those of the operating parameters of the reactors (treatment rate, doses of activated carbon, of coagulants and of flocculants, pH, hydraulic contact time/passage speed, residence time in the reactor, and the like).

One phenomenon in particular impacts the performance level of the adsorption: the concomitant presence of organic matter and micropollutants in the waters to be treated. Natural organic matter which is small in size (comparable in size to the micropollutants) in the waters decreases the effectiveness of the adsorption with regard to the micropollutants as it competes for the binding sites or can block access to the pores of the structure of the activated carbon. This is because the ratio of the concentrations between the organic matter and the pollutants to be removed by activated carbon exceeds 1000 and can reach 1 000 000. This phenomenon can consequently result in an additional treatment cost related to the contribution of larger amounts of activated carbon.

As regards the production of drinking water or of water intended for an industrial use, the removal of the organic matter and of the micropollutants in the networks for the treatment of these types of water is based essentially on coagulation and on adsorption. Coagulation takes place during the clarification stage and is carried out using different coagulants (iron salts are often employed). Adsorption can be carried out under different forms of carbon.

The configuration of the plants has changed over time with improvement in knowledge. It is thus possible to distinguish three types of treatment.

A first type of treatment employs stages of coagulation, of flocculation, of clarification (separated by settling or flotation) and of adsorption on granular activated carbon within a filter. This first type of treatment can comprise intermediate stages, for example of filtration through sand, of ozonation, and the like.

A second type of treatment employs the joint use of a coagulant and of a powdered activated carbon within one and the same clarification structure.

The choice of a powdered activated carbon with respect to a granular activated carbon makes it possible to adjust the dose to the quality of water to be treated on a day-to-day basis and to overcome the saturation problems specific to granular activated carbons.

As a portion of the organic matter can be removed both by coagulation and by adsorption, there is competition between the coagulant and the activated carbon with regard to the removal of these molecules. This is doubly damaging as the cost of the treatment unnecessarily increases (the treatment with the carbon costing more than the treatment with the coagulant) and a portion of the adsorption capacities of the activated carbon which would have been able to be used for the removal of molecules which can only be adsorbed has been neutralized by molecules which can be easily removed by coagulation.

This disadvantage led to the separation of a first stage of treatment by coagulation, flocculation and clarification (upstream structure) from a second stage of treatment with powdered activated carbon in a dedicated structure (downstream structure) with the possibility of recirculating a portion of the sludges from the downstream structure toward the upstream structure in order to make maximum use of the adsorption capacities of the material. This is because, after having adsorbed a certain amount of molecules in the downstream structure, the powdered activated carbon reaches a state of equilibrium in which it can no longer adsorb molecules. The recirculation of the powdered activated carbon which has reached such a state of equilibrium, from the downstream structure up to an upstream structure (typically the clarification structure), brings this powdered activated carbon into contact with a water which is more concentrated in molecules, thus breaking said state of equilibrium and making it possible for this powdered activated carbon to adsorb an additional amount of molecules.

Thus, a third type of treatment employs the separate use of the coagulant in an upstream clarification structure and of the powdered activated carbon in another downstream contacting or clarification structure optionally comprising recirculation of the sludges from the downstream structure toward the upstream structure.

As regards the treatment of the wastewaters, the regulatory framework defined for the purification of waters and also the changes which it has followed in recent decades make it possible for current purification plants to significantly reduce the particulate and organic matter of wastewaters before they are discharged.

The water is passed at least through a pretreatment, optionally a primary treatment (with or without chemical reagents) and a secondary biological treatment. As the purification plants have not been designed to treat micropollutants, these compounds, of varied physicochemical characteristics, are partially removed from the water through the treatment units of the purification plant via the following mechanisms:
  chemical degradation (oxidation) and biological degradation (biodegradation):
  adsorption on the sludge (particulate matter and biomass),
  volatilization (gas exchange with atmosphere).

After a conventional secondary low-load treatment, a varied number of micropollutants remain in the treated water with concentrations which can vary according to the compounds between 10 and 100 ng/l. In order to reduce these concentration levels and to limit the harmful effects which they may cause with regard to or via the environment, additional (advanced) treatments are thus necessary. Currently, for incorporating the technical and economic performance levels and the ease of incorporation of the additional structures in the existing plants, processes for oxidation with ozone and for adsorption on carbon are the most widely used in plants for the purification of wastewaters. These processes most of the time follow the stages of finishing, of retention of the particulate materials and of the phosphorus via mechanical filtration, on mineral filtering material, and/or coagulation flocculation. The latter stage also makes it possible to reduce the organic matter still present in the clarified wastewaters.

The patent FR 2 932 795 describes a process combining a finishing stage described above and an adsorption stage in a process for the purification of waters for the purpose of rendering them drinkable. This process incorporates separate treatment zones within which the arrival of water to be treated and the injection of fresh powdered activated carbon (contact zone 1), the recirculation of the spent powdered activated carbon (contact zone 2) by return of the concentrated sludges in the zone 4, the flocculation of the waters (zone 3) and the separation of the powdered activated carbon from the water to be treated are carried out.

The patent application FR 2 973 794 describes a process combining the coagulation, the flocculation and the separation by settling (ballasted) of the water to be treated in order to guarantee low concentrations of dissolved organic carbon in the treated water. The treatment plant incorporates a zone for precontact of the water to be treated with powdered activated carbon (zone 1) in which the spent powdered activated carbon is recirculated, a coagulation zone (zone 2) followed by a ballasted flocculation zone (zone 3) and then a lamellar clarification zone (zone 4).

There are a number of disadvantages to these solutions.

The activated carbon is not used or reused optimally from the viewpoint of its adsorption capacities and of the field of application where it is most effective and economically viable.

If the performance levels of the adsorption are influenced by the competition between the compounds to be adsorbed described above, it is also dependent on the concentration gradient between the solution (water to be treated) and the surface of the carbon according to the adsorption isotherms principle. According to this principle, the adsorption can be positive (the molecules go from the solution toward the adsorbing surface) or negative (the molecules go from the adsorbing surface toward the solution, giving rise to a more or less significant release of the compounds, according to their characteristics). After a given contact time, for a spent activated carbon which has reached its equilibrium in the initial solution (no more concentration gradient) but which is not necessarily saturated, the adsorption will still be possible only when it is brought back into contact with a more concentrated solution. In this solution, there will again exist a positive concentration gradient necessary for the adsorption.

The processes described in the patent FR 2 932 795 and the patent application FR 2 973 794 include a recirculation of powdered activated carbon but this is carried out downstream of the zone into which the fresh powdered activated carbon is injected. For this reason, the spent carbon is not recirculated under the ideal conditions (maximum concentration gradient) which would allow it to adsorb the maximum of molecules.

Furthermore, the fresh carbon, brought into contact in the first place with the water to be treated, will have a tendency to become saturated first by the adsorption of the organic matter present in greater concentration, to the detriment of the adsorption of the micropollutants, the concentration of which is generally lower.

In addition, the third type of treatment relating to the production of drinking water or of water intended for an industrial use, with a prior clarification of the water before the use of the activated carbon, is very effective and economical in reagents as the latter are used in the right order. However, this type of treatment involves an expensive capital investment as it requires two clarification structures: one after the coagulation and the other after bringing into contact with the powdered activated carbon.

One objective of the invention is to propose a process and a plant for the treatment of a water by contact with an adsorbing material, making it possible to overcome, in all or part, the disadvantages of the processes and plants of the prior state of the art.

SUMMARY OF THE INVENTION

This objective is achieved with a process for the treatment of a water, the water preferably comprising organic matter and micropollutants, this process comprising:

an adsorption stage in which the water is brought into contact with a fresh adsorbent, the water being known as "preadsorbed water" before it is brought into contact with the fresh adsorbent and being known as "adsorbed water" after it has been brought into contact with the fresh adsorbent, and a recirculation stage in which at least a portion of the fresh adsorbent brought into contact with the water during the adsorption stage is withdrawn, this withdrawn portion constituting a spent adsorbent, characterized in that, during the recirculation stage, the spent adsorbent is brought into contact with the preadsorbed water, and in that the preadsorbed water is not subjected to any clarification stage in which there is removed from the water, for example by separation by settling or by flotation, at least a portion of suspended matter which it contains.

In the context of the present invention, the term "adsorbed water" is understood to mean a water which has already been in contact with fresh adsorbent, independently of its clean quality or of a treatment which it has already been subjected to, and the term "preadsorbed water" is understood to mean a water which has not yet been in contact with the fresh adsorbent, this also independently of its clean quality or of a treatment which it has already been subjected to.

The fact of bringing the spent adsorbent into contact with the preadsorbed water makes it possible to optimize the use of the adsorption capacities of the adsorbent. This is because, after a given duration of contact of the water and of the fresh adsorbent, during the adsorption stage, the adsorbent reaches a point of equilibrium which no longer allows it to adsorb the molecules still present in the water (that is to say nonadsorbed molecules), the concentration of molecules in this water having progressively decreased over the duration of contact. In point of fact, this adsorbent, then spent, is not necessarily saturated and is capable of adsorbing molecules present in a water more concentrated in molecules, in this case the preadsorbed water.

This process makes it possible to save on an intermediate clarification structure by the fact of not carrying out a clarification stage upstream of the adsorption stage, while obtaining overall performance levels comparable to processes known in the prior state of the art in which such an intermediate clarification structure is employed. This is rendered possible in particular by the optimization of the use of the adsorption capacities of the adsorbent.

Preferably, the process additionally comprises a stage of maintenance of adsorbent-water contact in which the mixture consisting of the water and the adsorbent is kept in contact for a predetermined period of time, for example of greater than 5 minutes, advantageously of greater than 10 minutes and more advantageously equal to 20 minutes.

In accordance with the present invention, the adsorbent can be chosen from any type of adsorbent known to a person skilled in the art, such as activated carbon (whatever its particle size) or resin.

Preferably, the adsorbent is a powdered activated carbon.

The use of such an adsorbent in a process according to the invention makes it possible to optimally use or reuse the activated carbon, in comparison with the processes known in the state of the art, the powdered activated carbon being a relatively expensive material.

The process of the invention thus also makes it possible to reduce the cost of treatment of the water by reducing the amounts of adsorbent employed.

Preferably, the process additionally comprises a clarification stage in which the adsorbed water is separated from the suspended matter which it contains.

Within the meaning of the invention, this clarification stage can be carried out by any means known to a person skilled in the art, for example by separation by settling (for example on a pulsed sludge bed, and/or having sludge recirculation, and the like), by flotation or also by filtration.

According to an advantageous characteristic of the invention, the process can additionally comprise a coagulation stage in which the preadsorbed water is brought into contact with one or more coagulants, typically iron salts (for example ferric chloride) or alum.

Such a coagulation stage makes it possible to remove a portion of the organic matter present in the water before bringing this water into contact with the fresh adsorbent. Natural organic matter having a small size, comparable to the micropollutants, present in the waters which it is typically desired to treat using such a process, decreases the effectiveness of the adsorption with regard to the micropollutants as this organic matter and the micropollutants compete for access to binding sites of the adsorbent. Such an organic matter having a small size can thus block access to pores of the structure of the adsorbent and thus reduce the effectiveness of this adsorbent for adsorbing the micropollutants. Typically, the ratio of the concentrations of the organic matter to the micropollutants which it is desired to remove using the adsorbent exceeds 1000 and can reach 1 000 000. Thus, such a coagulation stage also makes it possible to reduce the cost of treatment of the water by reducing the amounts of adsorbent employed.

Preferably, the process additionally comprises a stage of maintenance of coagulant-water contact in which the preadsorbed water which has been subjected to the coagulation stage is stored in a chamber for a period of time of greater than 1 minute, advantageously of greater than 5 minutes and more advantageously equal to 10 minutes.

The preadsorbed water undergoing such a stage of maintenance of coagulant-water contact can comprise spent adsorbent withdrawn during the recycling stage.

Such a stage of maintenance of coagulant-water contact optimizes the effectiveness of the process, particularly in terms of amount of adsorbent. More specifically, the stage of maintenance of coagulant-water contact makes it possible to limit the competition between organic matter and micropollutants (see above) and improve the overall performance levels of the process, in particular when it is carried out after the coagulation stage.

In another embodiment of the invention, the process comprises an additional coagulation stage in which the adsorbed water is brought into contact with one or more coagulants, typically iron salts (for example ferric chloride) or alum. Such an additional coagulation stage makes it possible in particular to promote the separation of the adsorbent and of the water.

According to an advantageous characteristic of the invention, the process can additionally comprise a flocculation stage in which the adsorbed or preadsorbed water is brought into contact with a flocculating agent, typically a polymer.

Preferably, the flocculation stage is carried out after the stage of maintaining coagulant-water contact.

Advantageously, the water subjected to the treatment can be:

an urban or industrial wastewater, or a surface or underground water intended for the production of drinking water or for an industrial use.

The present invention also relates to a plant for the treatment of a water, this water preferably comprising organic matter and micropollutants, this plant being arranged in order to carry out a process as described above, this plant comprising:

an adsorption zone capable of bringing the water into contact with a fresh adsorbent, a recirculation branch capable of withdrawing at least a portion of the fresh adsorbent brought into contact with the water in the adsorption zone, the recirculation branch being arranged in order to bring the withdrawn portion of the adsorbent into contact with the water located upstream of the adsorption zone, this plant not comprising, upstream of the adsorption zone, a clarification structure, for example of settling tank or float tank type, arranged in order to remove, from the water, at least a portion of suspended matter which it contains.

Without limitation, the recirculation branch can be arranged in order to reinject the spent adsorbent into at least one of the following zones of the plant:

into the chamber which makes it possible to carry out the contact stage; and/or into a zone located between said chamber and the adsorption zone; and/or into a coagulation zone arranged in order to carry out the coagulation stage; and/or into a zone located between the coagulation zone and said chamber.

DESCRIPTION OF THE FIGURES AND EMBODIMENTS

Other advantages and distinguishing features of the invention will become apparent on reading the detailed description of implementations and of embodiments which are in no way limiting, and:

the appended FIG. 1, which diagrammatically represents an embodiment of the invention, the appended FIG. 2, which presents a comparison between the results obtained with an embodiment of the prior art and those obtained with an embodiment of the invention.

As the embodiments described below are in no way limiting, alternative forms of the invention can in particular be considered which comprise only a selection of characteristics described, singled out from the other characteristics described (even if this selection is singled out within a sentence comprising these other characteristics), if this selection of characteristics is sufficient to confer a technical advantage or to differentiate the invention with respect to the prior state of the art. This selection comprises at least one characteristic, preferably a functional characteristic, without the structural details or with only a portion of the structural details if this portion alone is sufficient to confer a technical advantage or to differentiate the invention with respect to the prior state of the art.

Figure 1:
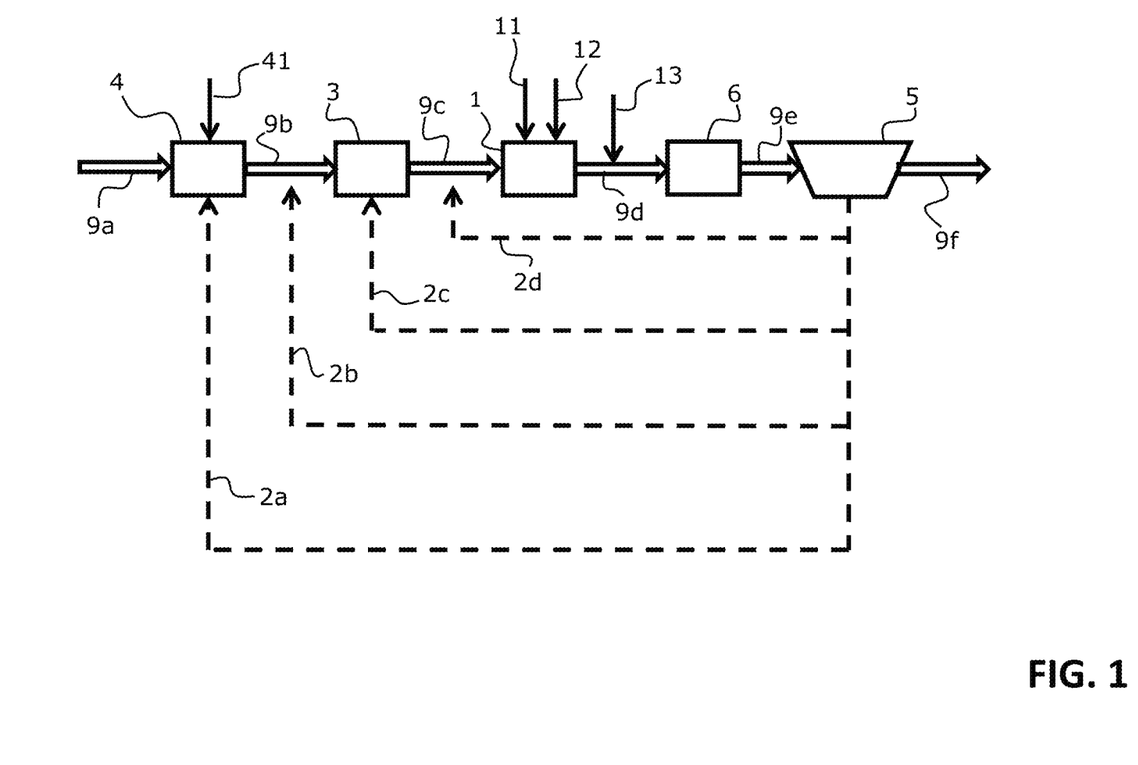

In the implementational example of FIG. 1, a plant according to the invention is arranged in order to treat a water transported successively into different zones, 1, 3, 4, 5, 6 of this plant. The transportation of the water is represented by the horizontal arrows 9a, 9b, 9c, 9d, 9e, 9f.

This plant comprises an adsorption zone 1.

The water arrives in the adsorption zone 1 via a channel 9c.

The adsorption zone 1 is arranged in order to bring the water into contact with a fresh adsorbent (adsorption stage). Before it is brought into contact with the fresh adsorbent, that is to say before entering the adsorption zone 1, the water is known as "preadsorbed water". After it has been brought into contact with the fresh adsorbent in the adsorption zone 1, the water is known as "adsorbed water".

The fresh adsorbent is typically powdered activated carbon. The fresh adsorbent is, for example, injected into the adsorption zone 1 by any appropriate injection means 11.

The adsorption zone 1 is, for example, a reactor, in particular of stirred tank type, or also a system for in-line injection of fresh adsorbent.

The adsorbed water exits from the adsorption zone 1 via a channel 9d.

In the example of FIG. 1, the adsorbed water exiting from the adsorption zone 1 arrives in a zone of maintenance of adsorbent-water contact 6 via the channel 9d.

The zone of maintenance of adsorbent-water contact 6 is arranged in order to carry out a stage of maintenance of adsorbent-water contact in which the mixture consisting of the water and the adsorbent is maintained in this zone 6 for a predetermined period of time, for example of greater than 5 minutes, advantageously of greater than 10 minutes and more advantageously equal to 20 minutes.

This zone of maintenance of adsorbent-water contact 6 can consist of a vessel distinct from the adsorption zone 1, for example as illustrated in FIG. 1.

Alternatively, the zone of maintenance of adsorbent-water contact 6 and the adsorption zone 1 can consist of one and the same zone (not illustrated), in which case both the adsorption stage and the stage of maintenance of adsorbent-water contact are carried out in this zone.

In the example of FIG. 1, the adsorbed water exiting from the zone of maintenance of adsorbent-water contact 6 arrives in a clarification structure 5 via the channel 9e.

This clarification structure 5 is arranged in order to separate the water from the suspended matter which it contains.

The clarification structure 5 is, for example, a settling tank, in particular a pulsed sludge bed and/or sludge recirculation settling tank, and the like, or a float tank.

The clarification structure 5 can comprise the zone of maintenance of adsorbent-water contact 6 (not illustrated). In this case, the stage of maintenance of adsorbent-water contact and the clarification stage are carried out in one and the same structure.

The water exits from the clarification structure 5 via a channel 9f.

The plant comprises a recirculation branch 2a, 2b, 2c, 2d (represented by arrows in dotted lines in FIG. 1) capable of withdrawing at least a portion of the fresh adsorbent brought into contact with the water in the adsorption zone 1. This withdrawn portion constitutes a spent adsorbent.

FIG. 1 represents a recirculation branch 2a, 2b, 2c, 2d carrying out:

a withdrawal of spent adsorbent from the clarification structure 5, and a reinjection of this spent adsorbent into different zones of the plant which are located upstream of the adsorption zone 1, so as to bring this spent adsorbent into contact with the preadsorbed water.

FIG. 1 illustrates a reinjection toward these different zones. However, it is possible, and preferable, to reinject the spent adsorbent into just one reinjection zone, for example into the channel 9c (loop 2d).

The withdrawal of spent adsorbent can be carried out by any means known to a person skilled in the art (for example, pumping, gravity, and the like).

The plant of FIG. 1 also comprises a coagulation zone 4 located upstream of the adsorption zone 1.

The water arrives in the coagulation zone 4 via a channel 9a.

The coagulation zone 4 is arranged in order to bring the preadsorbed water into contact with one or more coagulants (coagulation stage), typically iron salts (for example ferric chloride) or alum.

This or these coagulant(s) are, for example, injected into the coagulation zone 4 by any appropriate injection means 41.

The coagulation zone 4 can consist of a reactor of stirred tank type or can comprise a system for in-line injection and also a static mixer.

The water exits from the coagulation zone 4 via a channel 9b.

The plant of FIG. 1 additionally comprises a zone of maintenance of coagulant-water contact 3 located downstream of the coagulation zone 4 and upstream of the adsorption zone 1.

The zone of maintenance of coagulant-water contact 3 is arranged in order to carry out a stage of maintenance of coagulant-water contact in which the mixture consisting of the water and the coagulant is maintained in this zone 3 for a predetermined period of time, for example of greater than 1 minute, preferably of greater than 5 minutes and more preferably 10 minutes.

The water arrives in the contact zone 3 via the channel 9b.

The contact zone 3 is, for example, a vessel compartment or a chamber. Such a contact zone 3 can consist of a mechanically stirred tank or of a baffle tank.

Alternatively, the zone of maintenance of coagulant-water contact 3 and the coagulation zone 4 can consist of one and the same zone (not illustrated), in which case both the coagulation stage and the stage of maintenance of coagulant-water contact are carried out in this zone.

The water exits from the contact zone 3 via the channel 9c.

As illustrated in FIG. 1, the recirculation branch 2a, 2b, 2c, 2d can be arranged in order to reinject the spent adsorbent into at least one of the following zones of the plant:

into the zone of maintenance of coagulant-water contact 3 (loop 2c); and/or
into the channel 9c (loop 2d); and/or
into the channel 9b (loop 2b); and/or
into the coagulation zone 4 (loop 2a).

The invention also provides for bringing the adsorbed water into contact with one or more coagulants, typically iron salts (for example ferric chloride) or alum, for example by injecting this or these coagulant(s) into the adsorption zone 1 by any appropriate injection means 12, in order to carry out an additional coagulation stage. This means for injection 12 of the coagulant(s) can also be arranged in order to inject this agent into other zones of the plant (not illustrated).

In addition, the invention also provides for bringing the water into contact with a flocculating agent, typically a polymer, for example by injecting such a flocculating agent downstream of the adsorption zone 1 by any appropriate injection means 13.

The means for injection 13 of the flocculating agent can also be arranged in order to inject this agent into other zones of the plant (not illustrated).

As illustrated in FIG. 1, the plant comprises just one clarification structure 5 and, more specifically, does not comprise any clarification structure upstream of the adsorption zone 1.

The different zones 1, 3, 4, 5, 6 of the plant according to the invention can consist, according to different combinations, of separate structures or vessels or reactors or, for all or some of them, of compartments of one and the same structure or vessel or reactor.

Tests Carried Out

The inventors have carried out comparative tests of three processes A, B and C using a surface water, one dose of coagulant and three doses of powdered activated carbon of the same quality, as illustrated in table 1, which summarizes the operating conditions and the performance levels obtained with regard to the removal of organic matter for each of these processes.

The process A comprises the following stages, carried out successively:

Stage of virtually simultaneous injection of coagulant and of powdered activated carbon into one and the same structure (Ia, IIa and IIIa in table 1),
Stage of maintenance of coagulant-powdered activated carbon-water contact (IVa in table 1),
Stage of separation by settling (Va in table 1).

The process B comprises the following stages, carried out successively:

Stage of injection of a coagulant (Ib and IIb in table 1),
Stage of maintenance of coagulant-water contact (IIIb in table 1),
Stage of separation by settling (IVb in table 1),
Stage of injection of powdered activated carbon (Vb in table 1),
Stage of maintenance of powdered activated carbon-water contact (VIb in table 1),
Stage of separation by settling (VIIb in table 1).

The process C, corresponding to the process according to the invention, comprises the following stages, carried out successively:

Stage of injection of coagulant (Ic and IIc in table 1),
Stage of maintenance of coagulant-water contact (IIIc in table 1),
Stage of injection of powdered activated carbon (IVc in table 1),
Stage of maintenance of powdered activated carbon-water contact (Vc in table 1),
Stage of separation by settling (VIc in table 1).

TABLE 1

Comparative tests of processes A, B and C

| | Process A | | |
|---|---|---|---|
| Ia | 35 mg/l of $FeCl_3$ | 35 mg/l of $FeCl_3$ | 35 mg/l of $FeCl_3$ |
| IIa (coag. time) | 2 min | 2 min | 2 min |
| IIIa | PAC 5 mg/l | PAC 10 mg/l | PAC 15 mg/l |
| IVa | contact 20 min | contact 20 min | contact 20 min |
| Va | separation by settling | separation by settling | separation by settling |
| UV removed | 56% | 73% | 85% |
| DOC removed | 52% | 65% | 74% |
| | Process B | | |
| Ib | 35 mg/l of $FeCl_3$ | 35 mg/l of $FeCl_3$ | 35 mg/l of $FeCl_3$ |

TABLE 1-continued

Comparative tests of processes A, B and C

| IIb (coag. time) | 2 min | 2 min | 2 min |
|---|---|---|---|
| IIIb | contact 10 min | contact 10 min | contact 10 min |
| IVb | separation by settling | separation by settling | separation by settling |
| Vb | PAC 5 mg/l | PAC 10 mg/l | PAC 15 mg/l |
| VIb | contact 20 min | contact 20 min | contact 20 min |
| VIIb | separation by settling | separation by settling | separation by settling |
| UV removed | 83% | 85% | 90% |
| DOC removed | 65% | 74% | 78% |
| Process C ||||
| Ic | 35 mg/l of FeCl$_3$ | 35 mg/l of FeCl$_3$ | 35 mg/l of FeCl$_3$ |
| IIc (coag. time) | 2 min | 2 min | 2 min |
| IIIc | contact 10 min | contact 10 min | contact 10 min |
| IVc | PAC 5 mg/l | PAC 10 mg/l | PAC 15 mg/l |
| Vc | contact 20 min | contact 20 min | contact 20 min |
| VIc | separation by settling | Separation by settling | separation by settling |
| UV removed | 83% | 87% | 90% |
| DOC removed | 70% | 74% | 78% |

(UV = UV absorbance at 254 nm; DOC = dissolved organic carbon; coag. time = coagulation time)

These tests confirm the advantage of sufficiently separating, in time, the injections of coagulant and of powdered activated carbon in order to limit the phenomenon of competition between organic matter and micropollutants, and to obtain better overall performance levels (results of the tests show that the performance levels are better with the processes B and C than with the process A).

These tests also confirm that the intermediate clarification between the injection of coagulant and the injection of powdered activated carbon is not necessary with regard to the treatment of organic matter.

Figure 2:
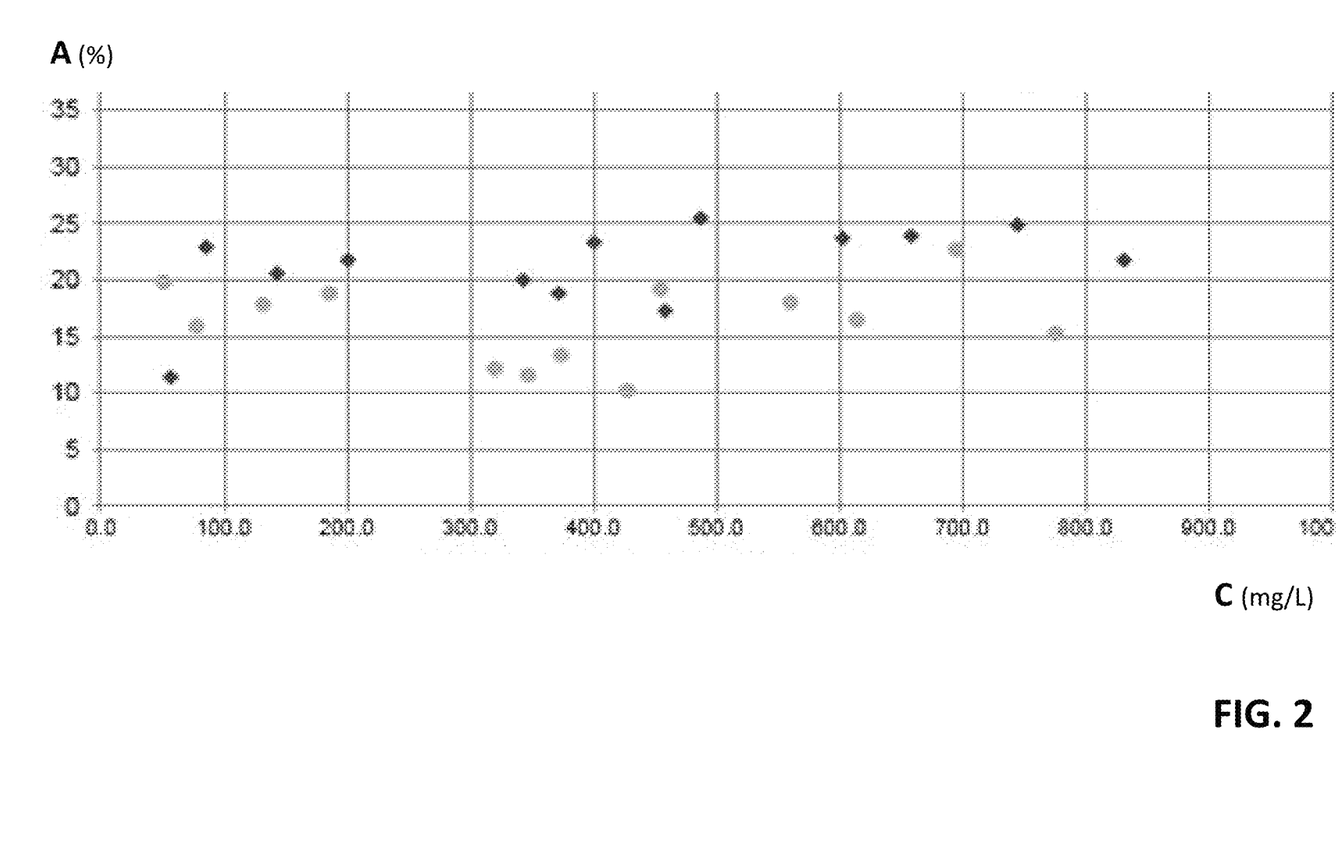

FIG. 2 illustrates comparative tests carried out between a first process known from the prior art and a second process in accordance with an embodiment of the invention.

The first and second processes comprise:
an adsorption stage in which the water is brought into contact with a fresh adsorbent, the water being known as "preadsorbed water" before it is brought into contact with the fresh adsorbent and being known as "adsorbed water" after it has been brought into contact with the fresh adsorbent, and
a recirculation stage in which at least a portion of the fresh adsorbent brought into contact with the water during the adsorption stage is withdrawn, this withdrawn portion constituting a spent adsorbent.

The first process comprises a stage of recirculation of spent powdered activated carbon into the adsorption zone. This recirculation of spent activated carbon takes place at the same point as the fresh activated carbon, or upstream.

The second process comprises one or more configurations for the recirculation of spent powdered activated carbon (represented diagrammatically in 2a, 2b, 2c and 2d in FIG. 1). This recirculation of spent activated carbon takes place in all the cases before the injection of the fresh activated carbon into the adsorption zone 1 by the adsorption means 11.

In short, in the first process, the recirculated spent activated carbon, that is to say the spent adsorbent, is injected into the adsorbed water, whereas, in the second process, the recirculated spent activated carbon is injected into the preadsorbed water.

FIG. 2 also represents the percentage of reduction on the ordinate, denoted A in %, as a function of the concentration of sludge in the adsorption zone on the abscissa, denoted C in mg/l, this being the case for the first and the second processes.

It is apparent that the reduction in the organic matter and micropollutants is greater with the second process (representation by dark squares). This is because the first process only makes it possible to obtain lower reductions (representation by light circles).

Of course, the invention is not limited to the examples which have just been described and numerous adjustments can be made to these examples without departing from the scope of the invention. Furthermore, the different characteristics, forms, variants and embodiments of the invention can be combined with one another according to various combinations insofar as they are not mutually exclusive or incompatible.

The invention claimed is:

1. A process for the treatment of a water, said process comprising:
an adsorption stage in which the water is brought into contact with a fresh adsorbent, the water being known as "preadsorbed water" before being brought into contact with the fresh adsorbent for the treatment of the water and being known as "adsorbed water" after being brought into contact with the fresh adsorbent, and
a recirculation stage in which at least a portion of the fresh adsorbent brought into contact with the water during the adsorption stage is withdrawn, this withdrawn portion constituting a spent adsorbent,
wherein, during the recirculation stage, the spent adsorbent is brought into contact with the preadsorbed water located upstream of the adsorption stage, the spent adsorbent being brought into contact with the preadsorbed water before the preadsorbed water is brought into contact with the fresh adsorbent,
wherein, the process further comprises a coagulation stage in which the preadsorbed water is brought into contact with one or more coagulants,
wherein the preadsorbed water is not subjected to any clarification stage in which there is removed from the water at least a portion of suspended matter which the preadsorbed water contains.

2. The process as claimed in claim 1, wherein the adsorbent is a powdered activated carbon.

3. The process as claimed in claim 1, further comprising a clarification stage in which the adsorbed water is separated from the suspended matter which the adsorbed water contains.

4. The process as claimed in claim 1, further comprising a stage of maintenance of coagulant-water contact in which the preadsorbed water which has been subjected to a coagulation stage is stored in a chamber for a period of time greater than 1 minute, advantageously greater than 5 minutes, more advantageously equal to 10 minutes.

5. The process as claimed in claim 4, further comprising a flocculation stage in which the adsorbed or preadsorbed water is brought into contact with a flocculating agent.

6. The process as claimed in claim 5, characterized in that the flocculation stage is carried out after the stage of maintenance of coagulant-water contact.

7. The process as claimed in claim 1, wherein the water is:
- an urban or industrial wastewater, or
- a surface or underground water intended for the production of drinking water or for an industrial use.

8. A plant for the treatment of a water, this plant being arranged in order to carry out a process as claimed in claim 1, this plant comprising:
- an adsorption zone (1) capable of bringing the water into contact with a fresh adsorbent,
- a recirculation branch (2a, 2b, 2c, 2d) capable of withdrawing at least a portion of the fresh adsorbent brought into contact with the water in the adsorption zone (1),
- wherein the recirculation branch (2a, 2b, 2c, 2d) is arranged in order to bring the withdrawn portion of the adsorbent into contact with the water located upstream of the adsorption zone (1), before the fresh adsorbent is brought into contact with the water in the adsorption zone,
- wherein the plant further comprises a coagulation zone (4) capable of bringing the water into contact with one or more coagulants, the coagulation zone being located upstream of the adsorption zone (1),
- and wherein the plant does not comprise, upstream of the adsorption zone (1), a clarification structure arranged in order to remove, from the water, at least a portion of suspended matter which the water contains.

9. The process as claimed in claim 2, further comprising a clarification stage in which the adsorbed water is separated from the suspended matter which the adsorbed water contains.

10. The process as claimed in claim 2, further comprising a flocculation stage in which the adsorbed or preadsorbed water is brought into contact with a flocculating agent.

11. The process as claimed in claim 3, further comprising a flocculation stage in which the adsorbed or preadsorbed water is brought into contact with a flocculating agent.

12. The process as claimed in claim 1, further comprising a flocculation stage in which the adsorbed or preadsorbed water is brought into contact with a flocculating agent.

13. The process as claimed in claim 3, wherein the water is:
- an urban or industrial wastewater, or
- a surface or underground water intended for the production of drinking water or for an industrial use.

14. The process as claimed in claim 2, wherein the water is:
- an urban or industrial wastewater, or
- a surface or underground water intended for the production of drinking water or for an industrial use.

15. The process as claimed in claim 4, wherein the water is:
- an urban or industrial wastewater, or
- a surface or underground water intended for the production of drinking water or for an industrial use.

16. The process as claimed in claim 1, wherein, during the coagulation stage, the preadsorbed water is brought into contact with the one or more coagulants upstream to the recirculation stage wherein the spent adsorbent is brought into contact with the preadsorbed water.

17. The plant as claimed in claim 8, wherein the coagulation zone (4) is located upstream to the recirculation branch arranged in order to bring the withdrawn portion of the adsorbent into contact with the water located upstream of the adsorption zone (1).

18. A process for the treatment of a water, said process comprising:
- an adsorption stage in which the water is brought into contact with a fresh adsorbent, the water being known as "preadsorbed water" before being brought into contact with the fresh adsorbent for the treatment of the water and being known as "adsorbed water" after being brought into contact with the fresh adsorbent, and
- a recirculation stage in which at least a portion of the fresh adsorbent brought into contact with the water during the adsorption stage is withdrawn, this withdrawn portion constituting a spent adsorbent,
- wherein, during the recirculation stage, the spent adsorbent is brought into contact with the preadsorbed water located upstream of the adsorption stage, the spent adsorbent being brought into contact with the preadsorbed water before the preadsorbed water is brought into contact with the fresh adsorbent,
- wherein in that the preadsorbed water is not subjected to any clarification stage in which there is removed from the water at least a portion of suspended matter which the preadsorbed water contains,
- and wherein the water is a surface or underground water intended for the production of drinking water or for an industrial use.

* * * * *